United States Patent Office 3,726,759
Patented Apr. 10, 1973

3,726,759
NUCLEAR REACTOR CONDENSER
SUPPORT STRUCTURE
William G. Taft, Pittsburgh, Rein Schiff, Turtle Creek, and A. John Iredale, Monroeville, Pa., assignors to Westinghouse Electric Corporation, Pittsburgh, Pa.
Filed Apr. 29, 1969, Ser. No. 820,074
Int. Cl. G21c 19/32
U.S. Cl. 176—37                          19 Claims

ABSTRACT OF THE DISCLOSURE

A lightweight structure for supporting a fusible material in a solid state in a condenser compartment of a nuclear reactor power plant containment in a configuration obtaining proper thermal-hydraulic relationships, and optimizing ease of construction, material condition and structure condition inspection, and dynamic load support, is provided. The supporting structure comprises an array of wire mesh interconnected tubular sections used to retain the material, and supported vertically by the condenser floor, and horizontally by positioning frameworks at required height intervals which locate the tubes in the desired array in such a manner as to effect cooling of the compartment over the entire surface with high ambient temperatures extended to the compartment, and maintaining uniform surface temperatures inside the compartment in consideration of the potential through conduction paths in the structural members. The resultant combined structural and thermal properties thereby adequately fulfill the requirements to maintain the location and configuration of the fusible solid under all postulated loading conditions and at the same time minimize the maintenance necessary on the fusible solid to meet the performance criteria during the lifetime of the plant.

CROSS-REFERENCES TO RELATED APPLICATIONS

Certain features disclosed in this application are claimed in a copending application, Ser. No. 820,073 filed Apr. 29, 1969 by S. J. Weems, H. W. McCurdy and L. W. Johnson, and assigned to Westinghouse Electric Corporation.

BACKGROUND OF THE INVENTION

This invention relates generally, to pressure-suppressing arrangements for nuclear reactor power systems and, more particularly, to a structure for supporting a fusible material in a solid state in a reactor containment system of a condenser type, such as described in Pat. No. 3,423,286, issued Jan. 21, 1969, to S. J. Weems, J. A. Hinds and I. H. Mandil, and assigned to the Westinghouse Electric Corporation.

Basically, the reactor containment system of the condenser type involves the rapid absorption of the energy released from a reactor coolant system in the improbable event of a loss-of-coolant accident. The energy is absorbed by condensing the steam in a low temperature heat sink consisting of a suitable quantity of a fusible material in a solid state, such as ice, stored in a cold storage compartment inside the reactor containment. The ability to form large amounts of heat transfer surface out of ice, as well as the high latent heat of fusion and low melting point of ice, make it particularly suitable for use as a heat sink.

However, the configuration of the ice condenser compartment creates special problems and requirements for a supporting structure. A basic requirement that the structure be enclosed by insulated cooling air ducts, and that no heat conduction be allowed through the insulated ducts into the ice chamber poses the problem of transmission of loads to the containment interior structure. The capacity and coverage of the hoisting equipment used for erection limit the size, weight and placement of structural components. The requirement of accurately locating and maintaining a definite, closely held inter-relationship between components in an enclosure built to tolerances obtainable in a concrete structure makes it necessary to provide for adjustment and alignment of the ice supporting structure. The basic configuration of the ice condenser, being high, narrow and a long circular arc, requires erection methods that allow the use of an erected portion as the working platform to erect adjacent sections, thus eliminating the need for continuously erecting and disassembling working scaffolds. A requirement that close surveillance of ice quantity and quality be maintained make it necessary to provide for ice weighing and ice quality checks without disassembly of the ice bed. Furthermore, the ice supporting structure must be capable of withstanding earthquake shocks.

Accordingly, an object of this invention is to provide a structure for supporting a fusible material in a solid state in a condenser compartment of a nuclear reactor containment which meets the foregoing requirements.

SUMMARY OF THE INVENTION

In accordance with an embodiment of the invention, a material supporting structure comprising generally trapezoidal positioning frames, sectionalized cylindrical containers, frame support columns, and wall panel beam sections builds its own erection platform as it is erected in a condenser compartment in a nuclear reactor containment and provides for easy weighing and visual inspection of the entire quantity of material by making each container removable. Each positioning frame forms the lateral locator and provides the lateral support for a plurality of containers. The weight of the structure and the material is supported by the condenser floor. A structure connection between the material supporting structure and the containment crane wall, through the crane wall cooling air duct panels, provides for transmission of lateral earthquake loads to the wall, while specifically eliminating any heat input into the material compartment from the "hot" crane wall. The structural connection and the positioning frame structure are constructed to provide proper dynamic response to earthquakes, thereby minimizing the dynamic loading.

Vertical support for the ice condenser is provided by a floor structure supported by a reinforced concrete base slab. The floor structure provides structural bearing members for the pertinent uniformly distributed and column loads. The loads due to lower support structure columns are carried through to the base slab by concrete pedestals, and the uniformly distributed loads are carried by radially disposed hollow steel beams supported from the base slab by circumferential concrete girders. The hollow beams convey cooling air from insulated duct panels on the containment wall under the floor and return the air to upflow ducts in the wall panels. Thus, an inversion of the temperature gradient is maintained in the concrete pedestal.

BRIEF DESCRIPTION OF THE DRAWINGS

For a better understanding of the nature and objects of the invention, reference may be had to the following detailed description, taken in conjunction with the accompanying drawings, in which.

DESCRIPTION OF PREFERRED EMBODIMENTS

Figure 1:
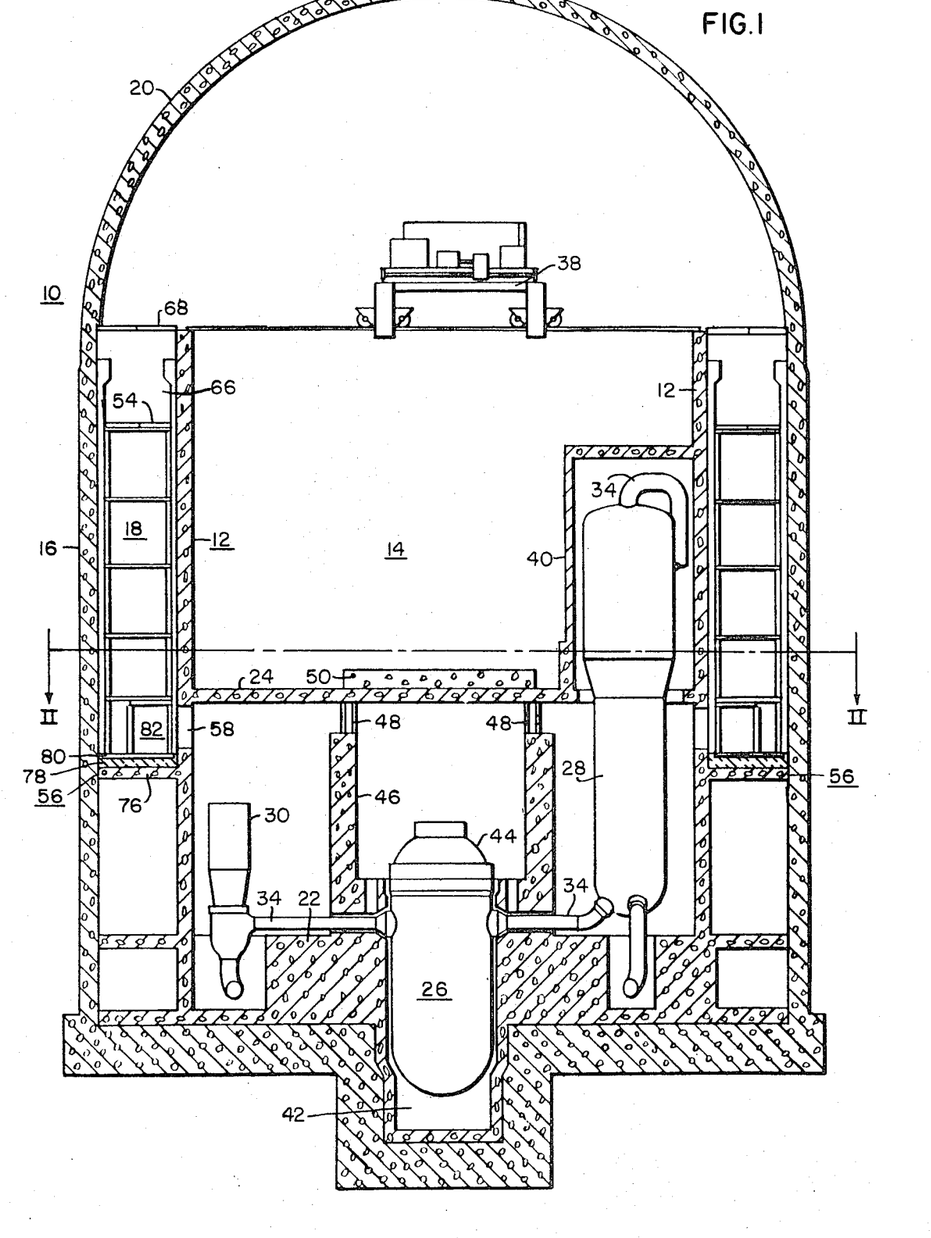
FIG. 1 is a vertical sectional view of a nuclear reactor containment having a condenser support structure embodying principal features of the invention.
Figure 2:
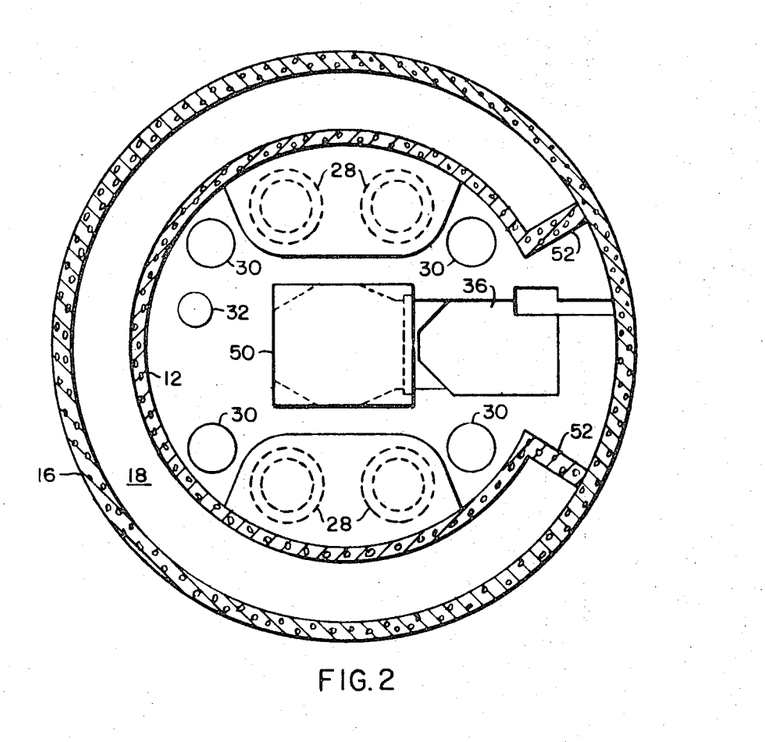
FIG. 2 is a sectional view, taken along the lines II—II in FIG. 1.

Referring to the drawings, particularly to FIGS. 1 and 2, a reactor containment structure 10 shown therein comprises an inner vertical generally cylindrical wall 12 defining a reactor compartment 14, and an outer vertical generally cylindrical wall 16 spaced from the inner wall 12 to define a generally annular condenser compartment 18 between the walls 12 and 16, a generally hemispherical head 20 supported by the outer wall 16, and a horizontal floor 22. The containment structure is preferably formed of concrete.

As shown, the reactor compartment 14 is divided into upper and lower portions separated by an operating deck 24. The lower compartment completely encloses the reactor coolant system equipment including a reactor vessel 26, stream generators 28, reactor coolant pumps 30, a pressurizer 32 shown in FIG. 2, and connecting piping 34. The upper compartment or portion contains a refueling canal 36 shown in FIG. 2, a crane 38, which is supported by the inner or crane wall 12, and additional refueling equipment (not shown). The steam generators 28 and the pressurizer 32 are enclosed by an extension 40 of the operating deck 24. The reactor vessel 26 is disposed in a well or sump 42 in the floor 22. The reactor vessel head 44 is enclosed by a primary shield 46 which is vented at 48. The vessel head enclosure is closed at the top by a removable concrete slab 50 which functions as a missile shield. The operation of the reactor power equipment is well known in the art and will not be described in this application.

As shown more clearly in FIG. 2, the condenser compartment 18 is in the form of a completely enclosed generally annular compartment which is located radially between the reactor coolant system compartment and the outer wall of the containment, and in elevation, is generally above the operating deck 24. The condenser compartment 18 does not extend entirely around the containment structure, but does extend through an arc of approximately 300° as shown in FIG. 2. Thus, the ends of the condenser compartment are enclosed by vertical end walls 52. The top of the condenser compartment is enclosed by horizontally hinged doors 54 and the bottom is enclosed by an insulated floor 56 as shown more clearly in FIG. 1.

Figure 3:
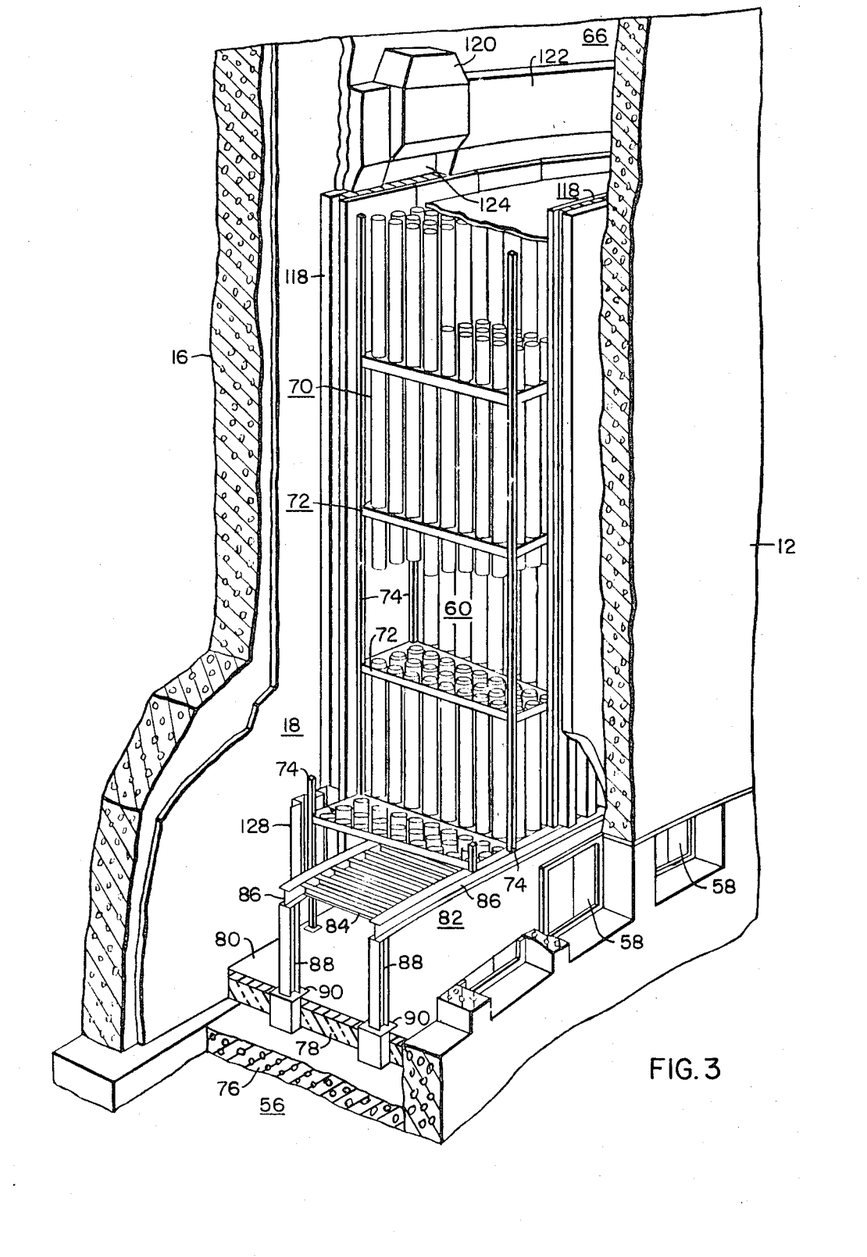
FIG. 3 is an isometric view of part of the condenser structure, portions being broken away for clearness.

As shown in FIG. 3, vertically hinged inlet doors 58 located below the operating deck 24 provide access into the condenser compartment from the reactor coolant system compartment. The condenser compartment 18 contains a quantity of fusible material 60, such as ice in a solid state. The material has the property of melting at a temperature lower than the condensation temperature of the condensable portions of the reactor coolant fluid which may escape from the reactor coolant system.

As described in the aforesaid Pat. 3,423,286, in the event of a loss-of-coolant accident, the inlet doors 58 would open immediately due to the pressurized steam in the lower compartment caused by the release of reactor coolant. This would allow the steam to flow from the lower compartment into the ice condenser. In turn, the door panels 54 at the top of the ice condenser would open and allow some of the air which was initially in the lower compartment and in the ice condenser compartment to flow into a plenum chamber 66, and thence into the upper reactor compartment through doors 68 located at the top of the plenum 66. The ice condenser would very quickly begin to condense the steam, thereby limiting the peak pressure in the containment structure 10.

The application of the ice condenser principle to the reactor containment requires a means for supporting a relatively large quantity of ice that will not only provide support and location of the ice in the proper thermal-hydraulic relationships, but a method that will also provide for ease in erection, maintenance, and surveillance. A basic requirement that the structure be enclosed by insulated cooling air ducts, and that no heat conduction be allowed through the insulated ducts into the ice chamber presents the problem of transmission of loads to the containment interior structure. A requirement that close surveillance of ice quantity and quality be maintained, make it necessary to develop a structural concept to accommodate ice weighing and ice quality checks without disassembly of the entire ice bed.

In accordance with the present invention, the fusible material, such as ice, is supported by a structure shown generally in FIG. 3. The structure comprises an array of generally cylindrical, sectionalized, porous containers 70 which are disposed in radial rows and retained in horizontally spaced relationship by means of horizontally disposed, vertically spaced positioning frames 72 supported by vertically extending support columns 74 located at the corners of the frames 72 which are generally trapezoidal in cross section.

In the embodiment shown, each positioning frame 72 forms the lateral locator for 27 cylindrical vertically extending containers 70 which are made in interconnecting sections of a predetermined length, for example 12 feet, to enable them to be readily assembled in the structure and to enable each container of ice to be removed by lifting each upwardly. The frames 72 are located at the joints between sections of the containers 70. Thus, each frame provides the lateral support for a 12 foot section of 27 containers. The supporting structure, its weight completely supported by the ice condenser floor 56, is erected by installing levels of the frames 72, each providing a platform to erect the next higher level.

As shown in FIG. 1, the floor 56 comprises a concrete base slab 76, a load bearing foam glass insulation bed 78 supported by the base 76, and a reinforced concrete slab 80 which is utilized as a wear surface and to distribute the column loads of a lower support structure 82. The lower support structure 82 supports approximately ⅔ of the ice and ice containers. The structure extends above the floor 56 to provide an access area behind the inlet doors 58.

As shown in FIG. 3, the lower support structure 82 is essentially a lattice of radial I-beams 84 located on the centerlines of the radial rows of ice containers 70. The radial I-beams 84 are supported by inner and outer main beams 86 running circumferentially around the condenser compartment 18. The main beam 86 are supported by vertical columns 88 which rest on the floor 56. The lower support columns 88 straddle the inlet condenser inlet doors 58 providing a clear area for the inlet doors. The columns 88 are mounted on bearing plates 90 attached to the floor 56. The columns 74 supporting the positioning frames 72 located at the inner wall of the condenser compartment rest on the inner circumferential beam 86. The columns 74 supporting the positioning frames 72 located at the outer wall of the compartment rest on the concrete slab 80.

Figure 4:
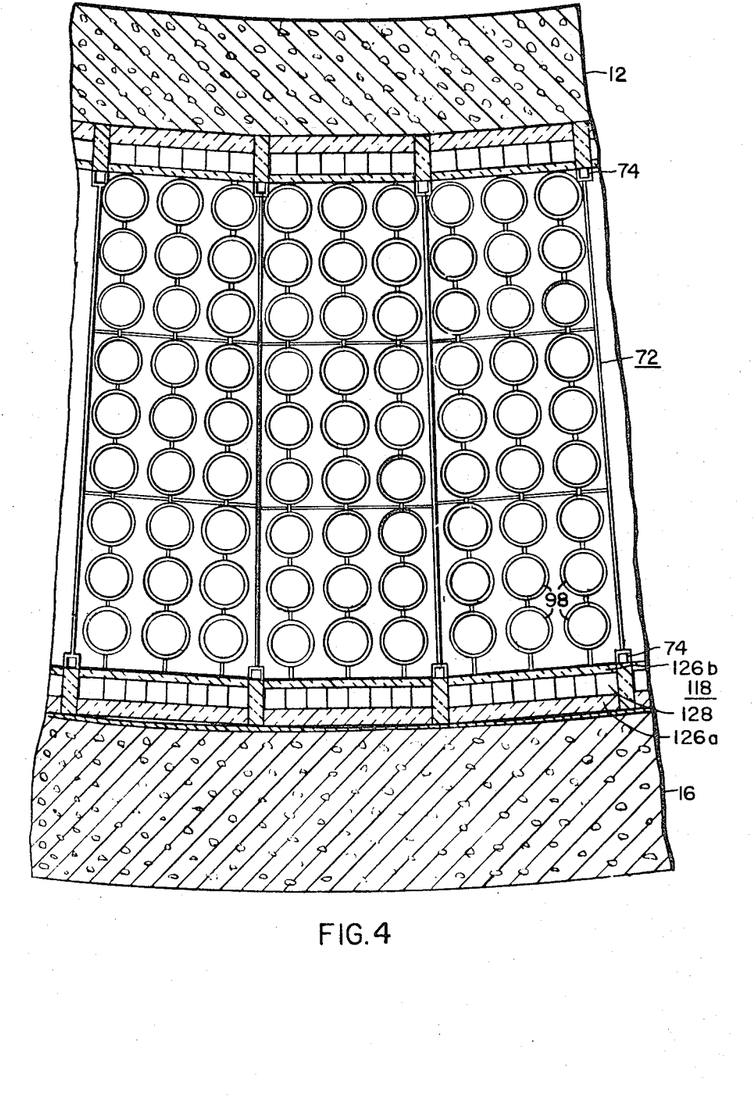
FIG. 4 is a view, partly in plan and partly in section, of a portion of the condenser structure and cooling duct arrangement.
Figure 5:
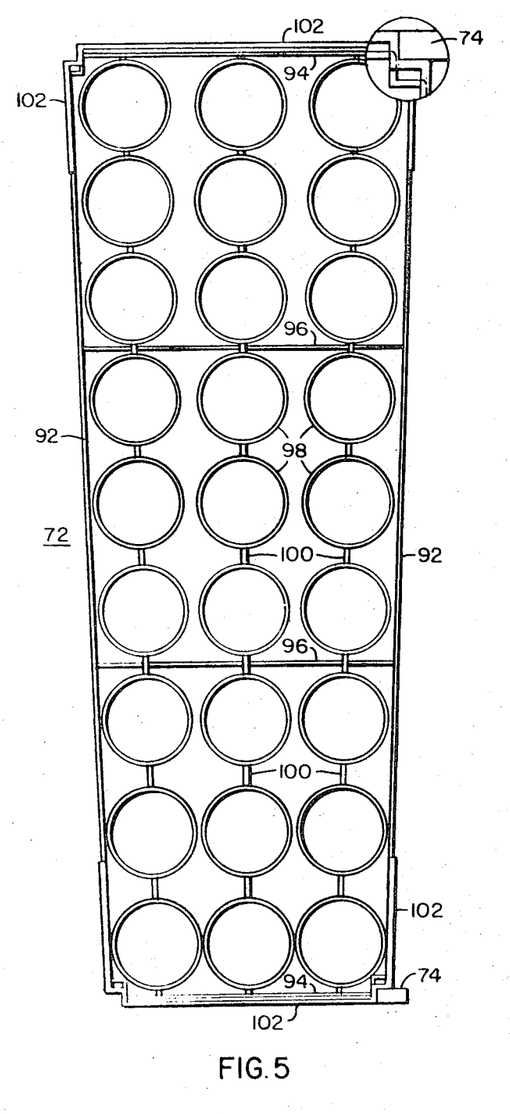
FIG. 5 is an enlarged view, in plan, of a positioning frame which may be utilized in the condenser.

As shown more clearly in FIGS. 4 and 5, each positioning frame 72 is generally trapezoidal in cross section to enable the frames to fit around the annular condenser compartment 18. Each frame is of welded steel construction and comprises peripheral side members 92, end members 94, cross members 96, cylindrical locators 98, and spacing members 100 which cooperate with the cross members 96 to retain the cylindrical containers 70 in horizontally spaced relation. As previously explained, the frames 72 are supported by the vertical columns 74 at each corner, each column serving adjacent frames. The columns 74 are built from rectangular metal sections.

The radial length of the frames is adjustable to accommodate construction clearances and permit vertical alignment of the container locations in the radial direction within the frames. The adjustment in length is obtained by means of end members 102 which are attached to the side members 92, through slotted connections which may be adjusted prior to securing the connection.

Figure 6:
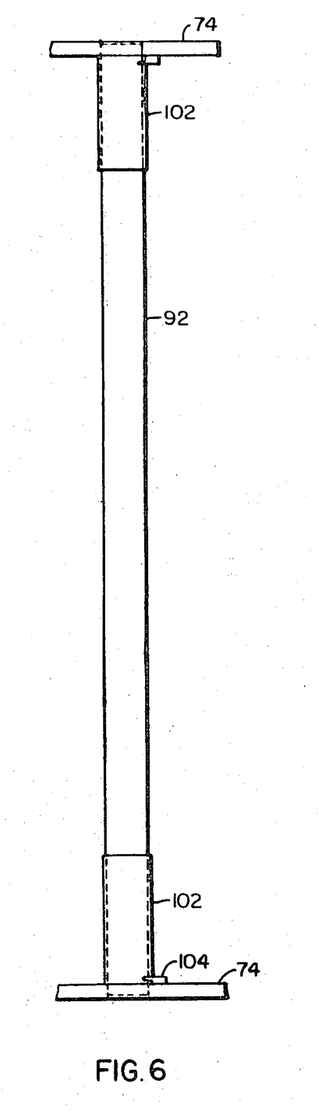
FIG. 6 is a view, in elevation, of the frame shown in FIG. 5.
Figure 7:
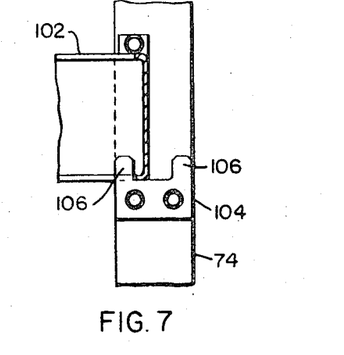
FIGS. 7 and 8 are enlarged detail views showing the manner of attaching a positioning frame to the columns which support the frames.
Figure 8:
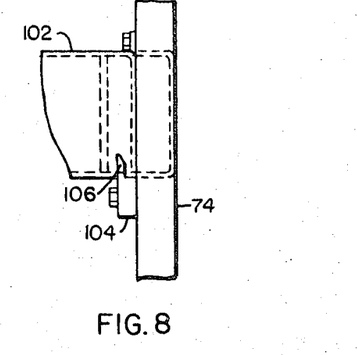

As shown more clearly in FIGS. 6, 7 and 8, the adjustable end members 102, at least one of which is provided for each frame, are supported on the support columns 74 by means of a bracket 104 attached to each column 74. The bracket 104 has spaced upwardly extending projections 106 which permit circumferential adjustment to accommodate construction clearances in the circumferentially direction.

Figure 13:
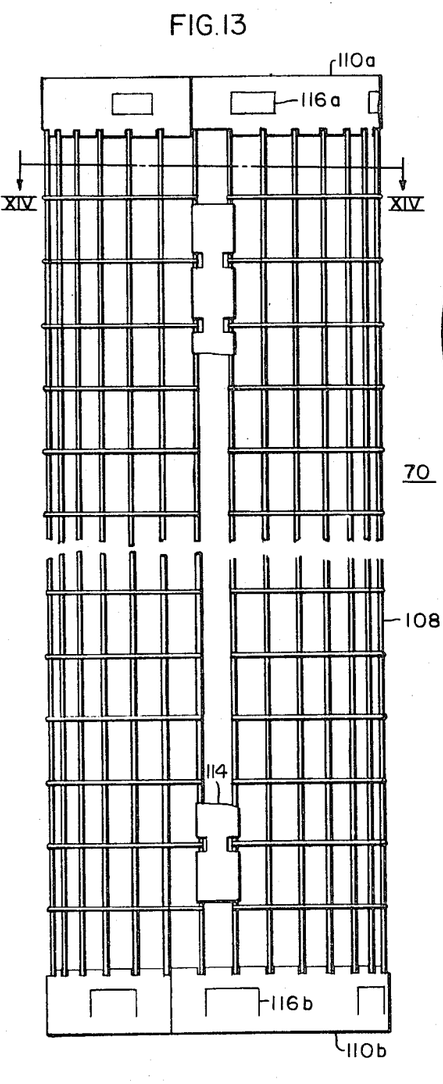
FIG. 13 is a view, in elevation, of one of the containers utilized in the condenser.
Figure 14:
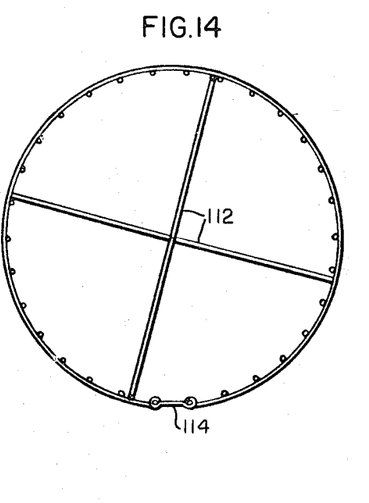
FIG. 14 is a view, in section, taken along the lines XIV—XIV in FIG. 13.

As shown more clearly in FIGS. 13 and 14, each container 70 is formed from wire mesh 108, or perforated metal, having relatively large openings therein to permit exposure of the steam to the ice contained within the container. Interconnecting stiffening rings 110a and 110b are located at the top and the bottom ends, respectively, of each section. Crossbar 112 may be located within the stiffening rings 110b at the bottom of each section to provide support for the ice in addition to the shear support provided by the wire mesh of the container. If desired, the cross bars 112 may be omitted. The vertical edges of the wire mesh 108 are joined by a vertically extending connecting strip 114 having portions bent around vertical wires of the mesh 108. The container sections are assembled into the positioning frames 72 to form a continuous column of ice the full height of the condenser. Only the bottom end of the lowest container of each column is closed to prevent the ice from falling through. Referring back to FIG. 3, two thirds of the containers rest on the raidial beams 84. The remaining containers rest on the concrete slab 80.

The container sections 70 are relatively light in weight and each can easily be handled by one man. The sections 70, are installed by inserting the top end through the upper frame locator 72, and connecting the lower end to the top of container section 70, below. As shown in FIGS. 13 and 14, the connection is a snap-lock type in which the lower end 110b of each section telescopes into the top end of the stiffening ring 110a on the container below. Spring-lock tabs 116b on the ring 110b snap into openings 116a on the ring 110a to retain the sections together. The locking tabs can be released by means of a suitable tool.

The containers are not attached to the positioning frames and when the sections of each container are connected together they form a removable column container for the full height of the ice bed. The ice is loaded from the top into the completed container assembly. The columns of ice can be lifted and removed in sections, and provision is made for lifting and weighing the whole length of selected columns for surveillance purposes.

The positioning frames 72 provide only lateral ice container support at the 12 foot intervals, which corresponds to the ends of the ice container sections, assuming that each section is 12 feet in height. The vertical support of the ice and the ice containers is transmitted by the containers to the floor and lower support structure of the condenser compartment.

In order to minimize mass transfer of the solid material 60, such as ice, due to sublimation and frosting, an insulation and cooling system of the type described in the aforesaid copending application may be utilized. As described in the aforesaid application, air, or other suitable low density fluid, is circulated in a circuit which is closed and effectively sealed relative to the condenser compartment 18 which is to be cooled. The air, or fluid, is cooled by passing over coils (not shown) located in the plenum 66 and forming part of a conventional refrigeration system.

As shown more clearly in FIG. 3, all of the vertical walls of the condenser compartment 18 are lined with vertically extending insulated duct panels 118 disposed between the solid materials 60 and the walls of the condenser compartment. Each panel 118 is a prefabricated integral air duct unit divided into downflow and upflow channels with a cross flow header at the bottom. Air is drawn from the plenum 66 through the refrigerator coils by fan units 120 and forced into the downflow channels through manifolds 122 which extend around the upper end of the panels 118. The air flows down through the downflow channels of each panel and returns through adjacent upflow channels of the panel. The returning air exhausts directly into the plenum 66 through exhaust openings 124.

In this manner, a substantially uniform temperature of the walls of the condenser compartment is maintained because of the equalizing effect of adjacent downflow and upflow channels in the insulated duct panels 118. To augment this, the interior vapor barrier face of the insulated duct panels is substantially isolated by thermal insulation in a manner that balances the capability to remove the required heat from the ice bed and the ability to maintain a substantially uniform surface temperature across the span of the face. This isolation provides a vapor barrier that is primarily influenced by the ice bed ambient and minimizes the effect of the temperature differences in the cooling duct. Furthermore, since the circulated air is not in direct contact with the ice, it does not absorb moisture from the ice, thereby reducing loss of ice by frosting.

As shown more clearly in FIG. 4, each duct panel 118 comprises in cross section a relatively thick layer of thermal insulation 126a, a metal duct 128 divided into downflow and upflow channels, and a relatively thin layer 126b of thermal insulation. Metal vapor barriers are provided at the outer surface of the thermal insulation 126a adjacent the containment wall and at the inner surface of the insulation 126b adjacent the solid material in the condenser compartment. As shown in FIG. 3, the channels in the metal duct 128 may be formed from rectangularly corrugated metal sheet.

Figure 16:
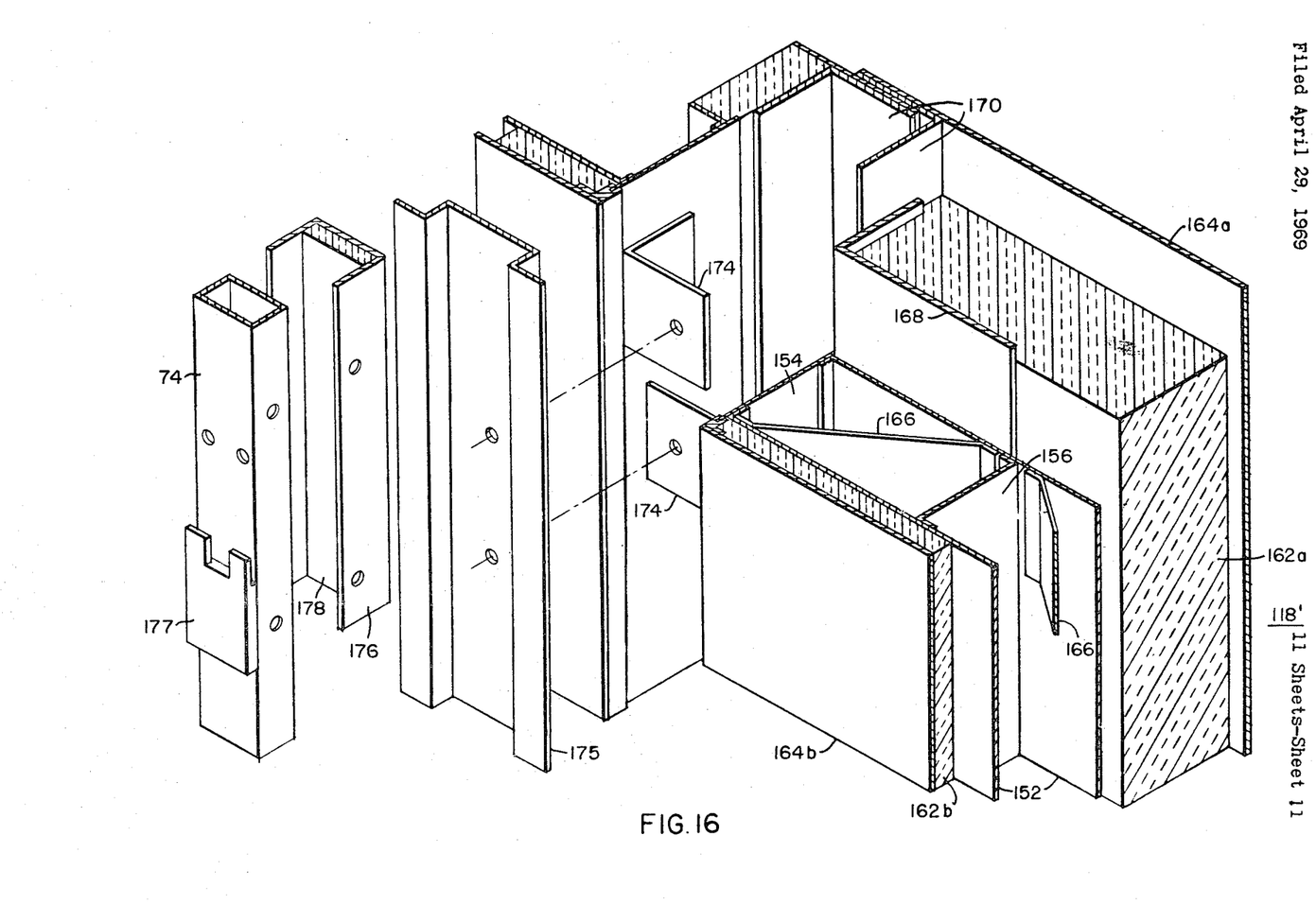
FIG. 16 is an enlarged exploded isometric view of a portion of the cooling duct arrangement shown in FIG. 9.

In order to restrain the condenser support structure to enable it to withstand earthquake shocks, positioning frames 72' and insulated fluid-conducting duct panels 118' shown in FIGS. 9–12, inclusive, and FIG. 16 are preferably utilized. A structural connection between the main support structure and the containment crane wall through the crane wall cooling air duct panels provides for transmission of lateral earthquake loads to the wall, while specifically eliminating any heat input into the ice bed compartment from the "hot" crane wall. The structural connection is incorporated in the duct panels and also provides for maintaining a vapor barrier at the crane wall surface and at the ice bed surface of the cooling air duct panels to eliminate moisture ingress into the ice bed. The connection and the positioning frame structure are constructed to provide proper dynamic response to earthquakes, thereby minimizing the dynamic loading.

Figure 9:
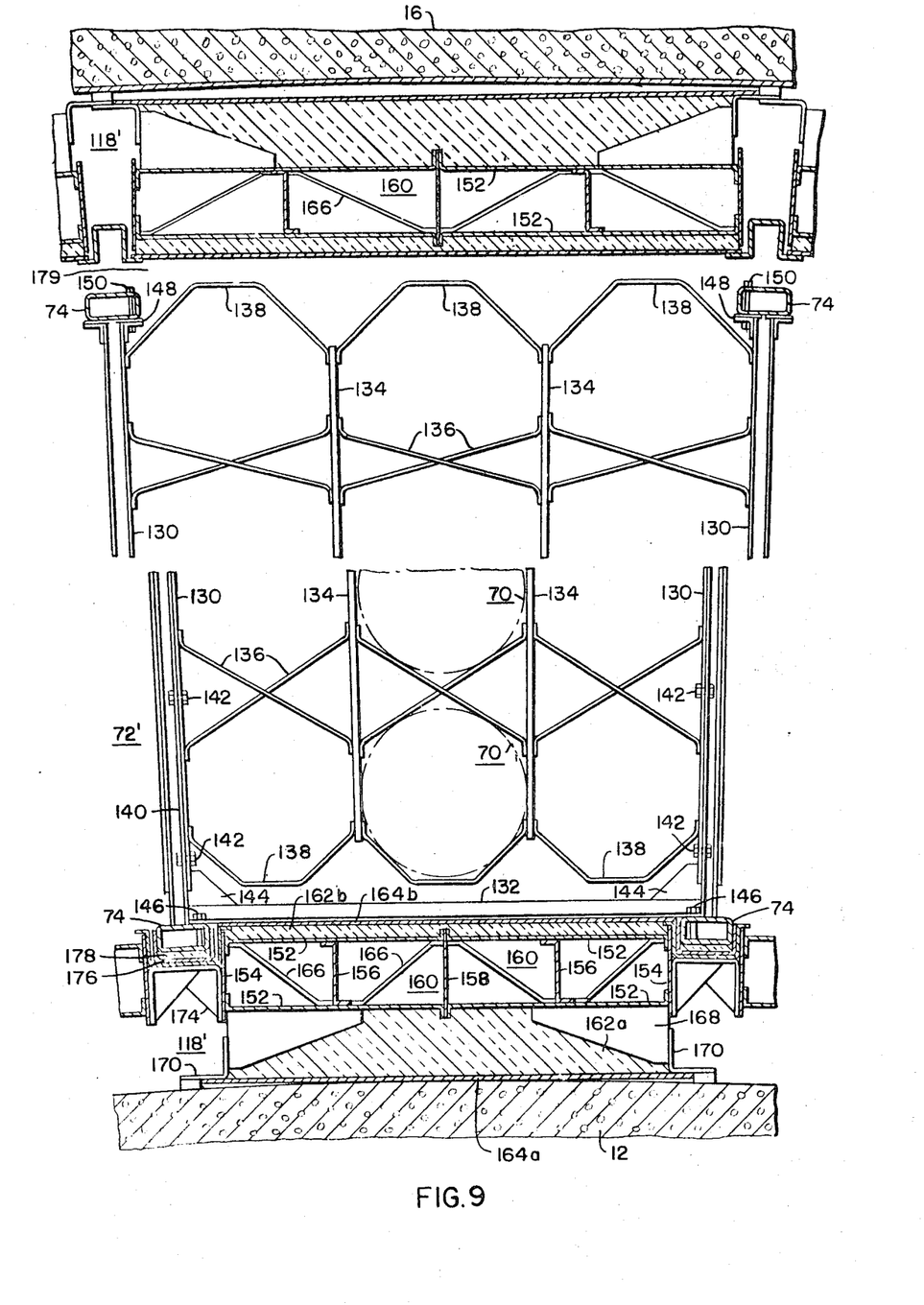
FIG. 9 is a view, partly in plan and partly in section, of a preferred positioning frame and cooling duct structural arrangement for the condenser.

As shown in FIG. 9, each positioning frame 72' is generally trapezoidal in cross section and comprises side members 130, an end member 132 tying the side members together at one end, longitudinally extending members 134 and angularly extending members 136 interconnected to provide generally hexagonal openings for receiving the cylindrical containers 70, and semi-hexagonal members 138 provided at each end of the frame 72' and cooperating with the members 134 and 136 to provide openings for receiving containers 70. Side members 140, tied together by the end member 132, are attached to the side members 130 by bolts 142, through slotted connections, to provide for longitudinal adjustment of the frame 72'.

As explained hereinbefore, the frames 72' are supported by vertical columns 74 at the corners of each frame, each column serving two adjacent frames. At the one end of the frame, the side members 140 are attached to the angle end member 132 by brackets 144, and the angle member 132 is attached to the columns 74 by bolts 146 which extend through the vertical support columns 74. At the other end of the frame, the side members 130 are attached to angle brackets 148 which, in turn, are attached to the columns 74 by bolts 150.

The frames 72' at the levels above the operating deck 24 are structurally connected to the containment crane wall 12 to provide lateral support and proper dynamic response for earthquake loading. This structural connection through the crane wall insulated cooling air duct panel is made in a manner that eliminates through heat flow into the ice bed from the "hot" crane wall. This is accomplished by building a beam into the duct panel at the frame elevation which is connected to the wall with brackets constructed to have maximum thermal resistance at the wall connection and to spread the heat conducted through the bracket to a duct surface area, sufficient to remove the heat input by the cooling air flow through the duct. The beam section is provided to transmit the ice structure tangential loads through the wall panels, to the crane wall 12.

Figure 10:
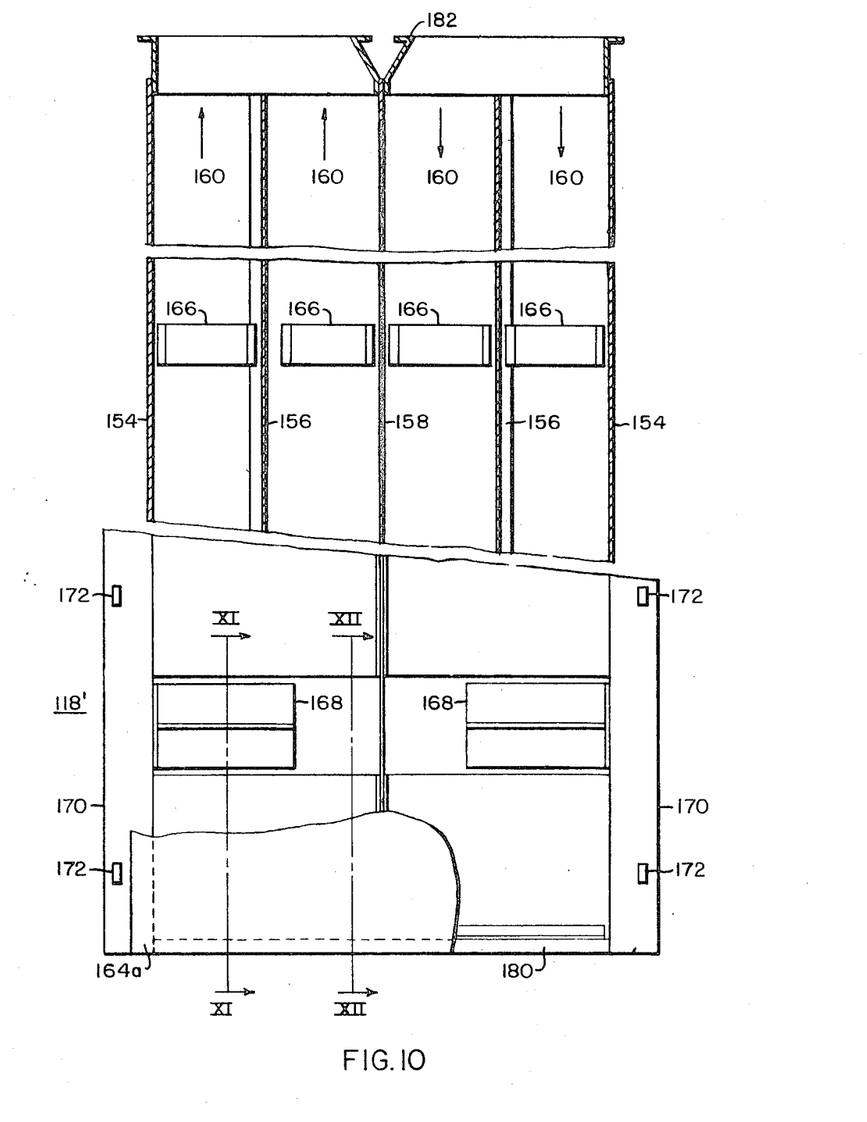
FIG. 10 is a view, partly in elevation, and partly in section, of one of the cooling duct panels utilized in the arrangement shown in FIG. 9.

As shown in FIGS. 9 and 16, the insulated duct panel 118' comprises spaced vertically extending side sheets 152 and end sheets 154 secured together to provide a generally rectangular duct. Vertically extending Z-columns 156 and a center plate column 158 divide the duct into four generally rectangular channels 160. A relatively thick layer of thermal insulation 162a is provided between the outer side wall 152 and a metal thermal barrier 164a which is adjacent the crane wall 12. A thinner layer of thermal insulation 162b is provided between the inner sidewalls 152 and a metal thermal barrier 164b which is adjacent the ice bed in the condenser compartment. Diagonally extending brace members 166 are provided in each channel 160 at elevation corresponding to the locations of the positioning frames 72'. Bracket members 168 located at substantially the same elevations as the brace members 166 are secured to the outer side panels 152 and to vertically extending angle members 170. The angle members 170 are attached to the crane wall 12 in a suitable manner, as by studs (not shown) installed in the crane wall. As shown in FIG. 10, the angle members 170 have oblong openings 172 for the mounting studs, thereby providing for longitudinally expansion.

The support columns 74 are attached to the duct 118' at the frame column connection elevation by two brackets. One bracket 174 is a right angle bracket attached to the end member 154 of the duct panel at the beam section and provides a bolting surface for the other bracket 176 which is channel shaped. The bracket 176 is combined with a vapor barrier lap strip 175 and an insulating block 178. This bracket provides an adjustable bolted connection between the support column 74 and the bolting face of the right angle bracket 174. It also provides the vapor barrier connection between panels by connecting and sealing the edges of the lap strip to the duct panel facings. A bracket is secured to the column 74 to help support the weight of the frame 72' which is bolted to the column.

The insulating block 178 provides the equivalent thermal resistance of the inner duct panel insulation at the bracket connection, thereby maintaining the same substantially uniform temperature at the connection, as across the face. The brackets 168 conduct any heat passing through the angle members 170 to the duct panels 152 from which it is absorbed by the cooling air flowing through the duct. In this manner, the positioning frames 72' are connected to the crane wall 12 through the structural means incorporated in the duct panels to transmit the ice structure loads through the wall panels to the crane wall 12, without through heat conduction into the ice bed.

The insulated duct panels 118' which line the containment wall 16 are similar in structure to the panels which line the crane wall except that each panel is wider because of the increase in circumference of the containment wall. Also, the positioning frames 72' are not attached to the outer containment insulated duct panels 118' which line the containment wall. A specific structural gap 179, adequate to provide a clearance between the containment insulated duct panels 118' and the positioning frames 72' to eliminate contact during earthquake, provides structural isolation of the ice condenser structure from the containment structure.

An alternate to this is to connect the containment insulated duct panels 118' to the outer end of the positioning frames 72' utilizing an adjustment member and mounting bracket similar to those used in the crane wall structural connection, and provide a specific structural gap between the outer insulated duct panels 118' and the containment structure 16 to isolate each from the other. As previously explained, the radial length of a frame 72' may be adjusted in accordance with the radial distance between the walls of the condenser compartment.

As shown in FIG. 10, each duct panel 118' may be made in two vertical sections which are similar in structure with the exception that the lower section has an enclosing bottom 180 and the upper section has a header 182 at the top. As previously explained, the header 182 may be connected to a manifold in the plenum chamber 66 to cause air to flow downwardly through the two right-hand channels 160 and upwardly through the two left-hand channels 160 from which it is exhausted into the plenum chamber.

Figure 11:
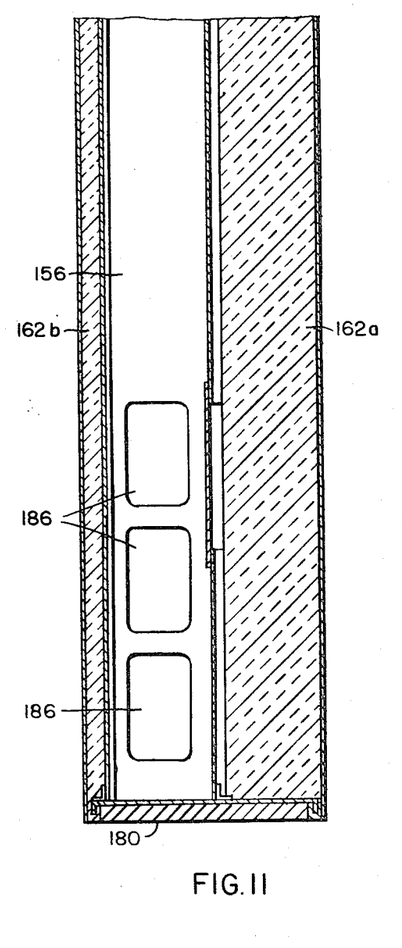
FIGS. 11 and 12 are enlarged sectional views, taken along the lines XI—XI and XII—XII, respectively, in FIG. 10.
Figure 12:
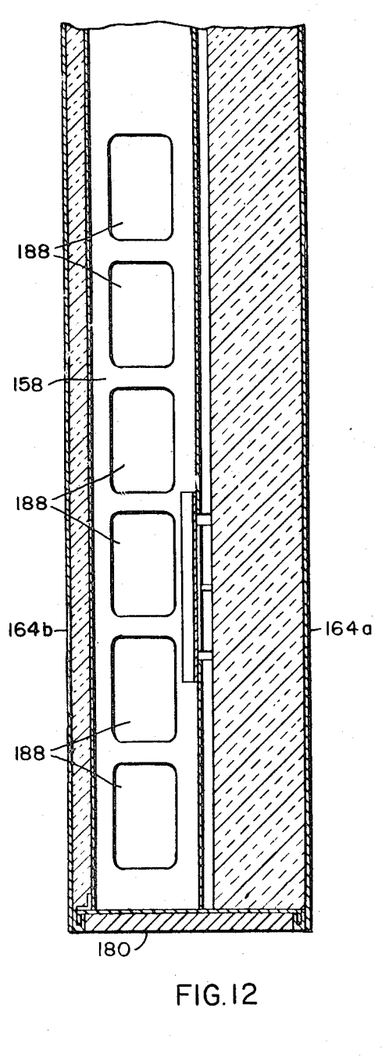

As shown in FIGS. 11 and 12, three generally rectangular openings 186 are provided in each one of the Z-columns 156 near the bottom of each column and six generally rectangular openings 188 are provided in the plate column 158. In this manner, air flowing downwardly through the two right-hand channels 160, as viewed in FIG. 10, passes through the openings 186 and 188 into the two left-hand channels 160 to flow upwardly in these channels to return to the plenum chamber. The six openings 188 handle the volume of air from two channels and the three openings 186 in each Z-column handle the volume of air from one channel.

Figure 15:
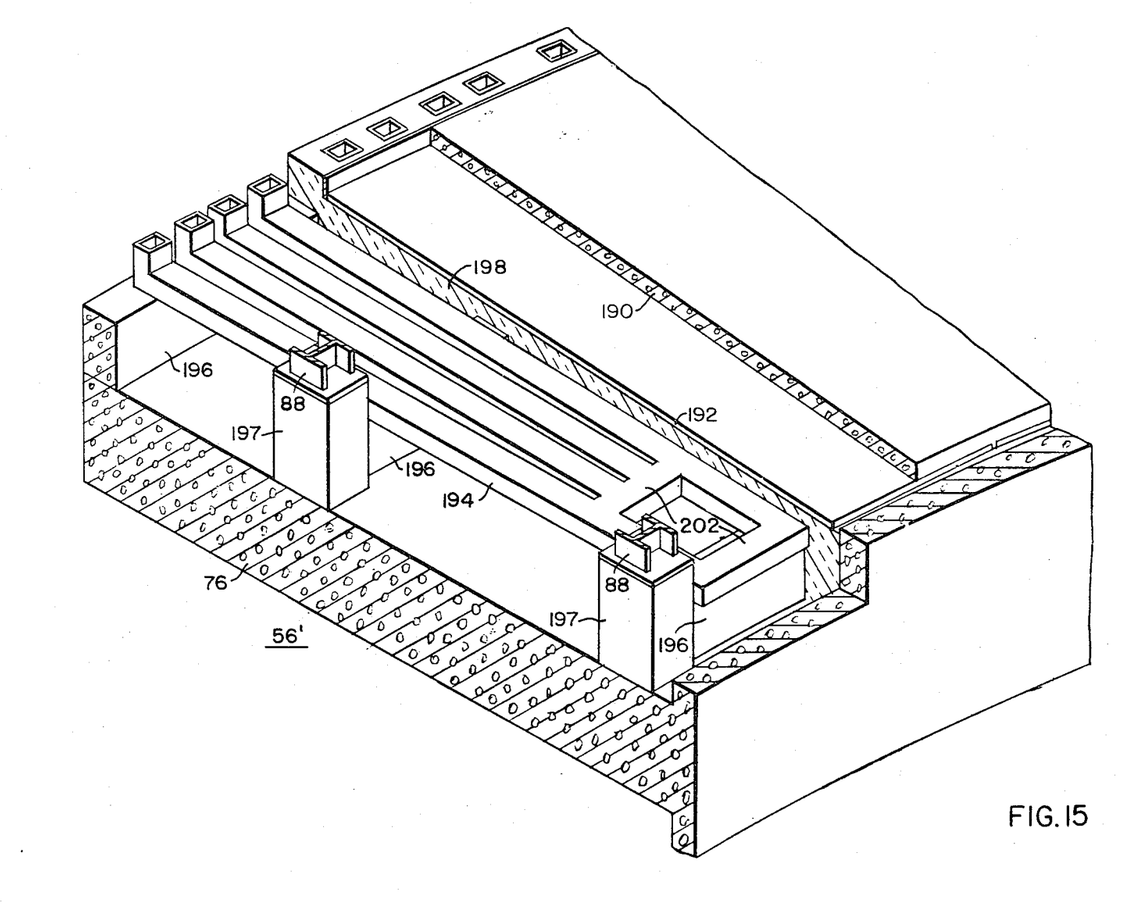
FIG. 15 is an isometric view, of part of a preferred floor and cooling arrangement for the condenser, portions being broken away for clearness.

A preferred floor arrangement 56' for the condenser compartment is shown in FIGS. 3 and 15. This floor comprises a concrete wear slab 190 supported by metal plates 192 which are supported by radial beams 194 which rest upon generally annular concrete girders 196 supported by the concrete bases 76. The girders 196 are located at the ends of the beams 194 and below the lower support structure columns 88 shown in FIG. 3. The concrete girders 196 incorporate concrete pedestals 197 which are continuous between the base 76 and the surface slab 190, thus providing structural footings for the lower support structure columns 88. The space between the girders 196 and the beams 194 is filled with thermal insulation 198.

The floor arrangement 56' may be cooled by making the beams 194 of hollow rectangular section through which cooling air is circulated. The outer ends of the hollow beams 194 are connected to duct panels 118' through headers 200 at the outer containment wall. The inner ends of the beams 194 are connected to cross-over headers 202 at the inner or crane wall. As shown by the arrows, the cooling air flows downwardly through downflow channels in a duct panel 118', flows across the floor through part of the beams 194 and returns across the floor through adjacent beams 194 and flows upwardly through upflow channels in the panel 118' in the manner hereinbefore described. Thus, a closed airflow path is provided for cooling the floor of the condenser compartment, thereby increasing the effectiveness of the insulation and cooling system, as well as increasing the mechanical strength of the supporting floor for the condenser compartment.

In this manner, all load bearing requirements on the insulation material of the floor are obviated, and by configuration and distribution of conduction surfaces an overall net cooling effect is induced in the ice condenser at the floor surface with the minimum variation in surface temperature. In particular, an inversion of the temperature gradient is maintained in the concrete pedestals.

From the foregoing description it is apparent that the invention provides a method of supporting the ice, or other solid material, of a nuclear power plant containment condenser in a configuration obtaining proper thermal-hydraulic relations and optimizing ease of construction, ice condition and structure condition inspection, and dynamic load support, by utilizing a relatively lightweight structure.

Since numerous changes may be made in the above-described construction and different embodiments of the invention may be made without departing from the spirit and scope thereof, it is intended that all subject matter contained in the foregoing description or shown in the accompanying drawings shall be interpreted as illustrative and not in a limiting sense.

What we claim is:

1. In a pressure-suppressing arrangement for pressurized fluid-handling apparatus including a nuclear reactor portion from which a pressurized expansible fluid may escape, in combination, a containment including a reactor compartment and a condenser compartment normally isolated from the reactor compartment and having vertical walls and a horizontal floor, means for supporting a quantity of fusible material in a solid state in the condenser compartment, said means comprising an array of vertically extending generally cylindrical porous containers for the material, said cylindrical containers being formed of a plurality of cylindrical sections of a predetermined length assembled end to end to form continuous columns, said cylindrical container sections having stiffening rings at their ends, said stiffening rings having telescoping portions with locking spring tabs thereon for releasably retaining the cylindrical sections in assembled relation, a plurality of horizontally disposed vertically spaced frames for retaining said containers in horizontally spaced relation, said material having the property of melting at a temperature lower than the condensation temperature of the condensable portions of said escaping fluid, and cooling means for maintaining said material in a solid state except when exposed to said escaping fluid.

2. The combination defined in claim 1, wherein each frame is generally trapezoidal in cross section, and including vertically extending column members disposed at corners of the frames to support said frames, and each frame having at least one adjustable member to vary the length of the frame.

3. The combination defined in claim 1, wherein the intermediate members include cylindrical locators for receiving the containers and cross members for providing lateral support for the containers, the weight of the containers and the material in the containers being supported by the floor of the condenser compartment.

4. The combination defined in claim 1, wherein the frame includes intermediate members comprising angularly and longitudinally extending members interconnected to provide openings for receiving the containers.

5. The combination defined in claim 4, wherein the angularly and longitudinally extending members are interconnected to provide generally hexagonal openings for receiving the containers and providing lateral support for the containers.

6. In a containment for pressurized fluid-handling apparatus including a nuclear reactor portion from which a pressurized expansible fluid may escape, in combination, an inner vertical generally cylindrical wall defining a reactor compartment, an outer vertical generally cylindrical wall spaced from the inner wall to define a generally annular condenser compartment between said walls, means for supporting a quantity of fusible material in a solid state in the condenser compartment, said means comprising an array of vertically extending generally cylindrical porous containers for the material, a plurality of horizontally disposed vertically spaced frames for retaining said containers in horizontally spaced relation, said material having the property of melting at a temperature lower than the condensation temperature of the condensable portions of said escaping fluid, cooling means including fluid-conducting vertically extending duct panels disposed between the material and the walls for maintaining said material in a solid state except when exposed to said escaping fluid, and structural means connecting said frames to one of said walls to provide lateral support for the frames and the material.

7. The combination defined in claim 6, wherein the structural means is incorporated in the duct panels.

8. The combination defined in claim 6, wherein the duct panels include vertically extending dividing members and vertically spaced brace members forming said structural means.

9. The combination defined in claim 8, wherein brace members are at substantially the same elevations as the frames.

10. The combination defined in claim 6, wherein the frames are generally trapezoidal in cross section, and including vertically extending colunms at the corners of the frames for supporting the weight of the frames.

11. The combination defined in claim 1, wherein the floor comprises a concrete base, spaced generally annular girders supported by the base, spaced generally radially extending hollow beams supported by the girders, insulating material in the spaces between said girders and said beams, a metal plate supported by said beams, a concrete slab supported by the plate, and wherein the cooling means includes means for circulating a cooling fluid through said hollow beam, to provide an inversion of the temperature gradient through all sections of the floor and an approximately uniform surface temperature in the condenser compartment.

12. The combination defined in claim 11, including fluid-conducting vertically extending insulated duct panels disposed between the fusible material and one of the walls, and said panels having ducts therein communicating with said hollow beams.

13. The combination defined in claim 12, wherein the ducts in each panel are divided into downflow and upflow channels, with the downflow channels communicating with certain of said hollow beans and the upflow channels communicating with others of said hollow beams.

14. The combination defined in claim 13, including means connecting the ends of beams communicating with downflow channels with the ends of beams communicating with upflow channels.

15. The combination defined in claim 1, wherein said containers are disposed in radial rows, and including radial beams located above the floor on the center lines of at least part of the radial rows of containers, main beams running circumferentially around the condenser compartment to support the radial beams, and vertical columns resting on the floor to support the main beams.

16. The combination defined in claim 15, wherein the floor includes generally annular girders disposed underneath the vertical columns.

17. The combination defined in claim 11, wherein the girders incorporate spaced pedestals which are continuous between the base and the slabs.

18. The combination defined in claim 16, wherein the girders incorporate spaced pedestals disposed underneath the vertical columns to support the columns.

19. The combination defined in claim 18, wherein the cooling means includes means for circulating a cooling fluid through the hollow beams to maintain an inversion of the temperature gradient in said pedestals.

References Cited
UNITED STATES PATENTS

| | | | |
|---|---|---|---|
| 416,405 | 12/1889 | Fouquet | 62—113 |
| 2,007,690 | 7/1935 | Nystrom | 62—302 |
| 3,423,286 | 1/1969 | Weems et al. | 176—37 |

REUBEN EPSTEIN, Primary Examiner

U.S. Cl. X.R.

62—459, 312